(12) United States Patent
Kim et al.

(10) Patent No.: US 10,601,290 B2
(45) Date of Patent: Mar. 24, 2020

(54) MOTOR

(71) Applicant: LG Electronics Inc., Seoul (KR)

(72) Inventors: Jaeho Kim, Seoul (KR); Byungkuk Kam, Seoul (KR); Chisung Park, Seoul (KR); Jihyun Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 122 days.

(21) Appl. No.: 15/887,477

(22) Filed: Feb. 2, 2018

(65) Prior Publication Data

US 2018/0226864 A1 Aug. 9, 2018

(30) Foreign Application Priority Data

Feb. 3, 2017 (KR) .................. 10-2017-0015377

(51) Int. Cl.
*H02K 1/14* (2006.01)
*H02K 15/02* (2006.01)
*H02K 3/52* (2006.01)
*H02K 21/14* (2006.01)
*H02K 1/16* (2006.01)
*H02K 16/04* (2006.01)

(52) U.S. Cl.
CPC ............. *H02K 15/024* (2013.01); *H02K 1/14* (2013.01); *H02K 1/143* (2013.01); *H02K 1/146* (2013.01); *H02K 1/148* (2013.01); *H02K 1/165* (2013.01); *H02K 3/524* (2013.01); *H02K 16/04* (2013.01); *H02K 21/14* (2013.01); *H02K 2213/03* (2013.01)

(58) Field of Classification Search
CPC .......... H02K 1/14; H02K 1/141; H02K 1/143; H02K 1/148; H02K 15/024; H02K 21/14; H02K 1/146; H02K 16/04; H02K 1/165; H02K 3/524; H02K 2213/03

USPC ..... 310/216.008, 216.083, 216.097, 216.111
See application file for complete search history.

(56) References Cited

U.S. PATENT DOCUMENTS 6,462,907 B1 * 10/2002 Masuzawa ............... H02K 1/14
                                                                   360/133
2007/0273241 A1 * 11/2007 Niguchi .................. H02K 21/16
                                                                310/216.001
(Continued)

FOREIGN PATENT DOCUMENTS

| CN | 101924447 | 12/2010 |
|---|---|---|
| CN | 104104160 | 10/2014 |

(Continued)

OTHER PUBLICATIONS

Machine Translation, Hashimoto, JP-09019123-A, Jan. 1997. (Year: 1997).*

(Continued)

*Primary Examiner* — Thomas Truong
(74) *Attorney, Agent, or Firm* — Fish & Richardson P.C.

(57) ABSTRACT

A motor including a stator includes a first stator core, and a second stator core that is independent from the first stator core and that is symmetric to the first stator core with respect to a vertical line that passes through a center of the stator. Each of the first and second stator cores includes a yoke, a center tooth that extends from a center of the yoke toward the center of the stator, and outer teeth that extend from a first end of the yoke and a second end of the yoke, respectively. The center tooth is located between the outer teeth, and a length of the outer teeth is greater than a length of the center tooth.

16 Claims, 5 Drawing Sheets

(56) References Cited

U.S. PATENT DOCUMENTS

| | | |
|---|---|---|
| 2010/0314962 A1 | 12/2010 | Shiga |
| 2013/0089444 A1 | 4/2013 | Sugimoto |
| 2013/0094982 A1* | 4/2013 | Sugimoto ............... H02K 1/14 |
| | | 417/423.7 |
| 2013/0136636 A1 | 5/2013 | Ikeya |

FOREIGN PATENT DOCUMENTS

| | | | |
|---|---|---|---|
| EP | 1202430 | A1 | 5/2002 |
| JP | 09019123 | A * | 1/1997 |
| JP | 3284455 | B2 | 5/2002 |
| JP | 2004236487 | A1 | 8/2004 |

OTHER PUBLICATIONS

Extended European Search Report in European Application No. 18154867.8, dated Apr. 13, 2018, 10 pages.

Chinese Office Action in Chinese Application No. 201810112398.6, dated Jul. 2, 2019, 19 pages (with English translation).

* cited by examiner

MOTOR

CROSS-REFERENCE TO RELATED APPLICATIONS

This application claims priority to Korean Patent Application No. 10-2017-0015377, filed on Feb. 3, 2017, in Korea, the entire contents of which is hereby incorporated by reference in its entirety.

FIELD

The present disclosure relates to a motor, more particularly, a motor having an improved performance and a reduced manufacturing cost.

BACKGROUND

A motor can transmit a rotational force of a rotor to a shaft so that the shaft may drive a load. For example, the shaft may be connected to a drum of a washing machine to drive the drum. In some examples, the shaft may be connected to a fan of a refrigerator to drive the fan to supply cold air to a space. As another example, the motor may be used in a compressor to compress refrigerant.

A rotor in a motor can be rotated by an electromagnetic interaction with a stator. In some example, a coil may be wounded around the stator so that the rotor can rotate with respect to the stator as an electric current is applied to the coil.

The stator may include a stator core, and the stator core may be made of a conductor, for instance. In some examples, the stator may include a structure that is fixed to an object such as a motor housing, a motor bracket, or a tub of a washing machine.

FIG. 1 illustrates a conventional 3-phase-4-polarity-6-slot motor according to the related art.

The motor 1 includes a stator 10 and a rotor 20. The rotor 20 is provided in the stator and configured to be rotatable with respect to the stator.

The stator 10 may include a yoke 11, and a plurality of teeth 12 that are projected inwards from the yoke 11. A pole shoe 13 extends from an inner radial end of the teeth 12 in both circumferential directions.

A slot 14 is defined between two teeth in a space where a coil 15 is wounded. The coil 15 is wounded around one of the teeth 12 to fill in both slots 14 located nearby.

The coil 15 is wounded to distinguish u-phase, v-phase and w-phase from each other to apply 3-phase AC to the motor. As one example, u-phase, v-phase and w-phase coils are alternatively wounded around the teeth along a circumferential direction.

A securing hole 16 may be defined in the yoke 11 to secure the stator 10 or the motor 1 to an object. The securing hole 16 may be provided in the outermost area of the yoke 11 in order not to affect the magnetic flux.

The yoke 11 may have a ring shape. In some examples, as shown in FIG. 1, the yoke 11 may have a polygonal shape. In any shapes, the yoke 11 may be continuously formed along a circumferential surface. In these cases, a magnetic body forming the yoke may be provided along the circumferential surface.

The teeth 12 may be provided with the yoke 11. For example, the teeth 12 may be integrally formed with the yoke 11 as one body so that the teeth 12 together with the yoke 11 may be referenced to as a stator core. The stator core before the coil is wounded may have a uni-body structure.

The rotor 20 may include a ring-shaped rotor core 21. A shaft hole 22 may be formed in the center of the rotor core 21. The shaft is insertedly coupled to the shaft hole and the rotation of the rotor may generate the rotation of the shaft.

A plurality of coupling holes 23 may be formed in the rotor core 21 and steel plates are multi-layered via the coupling holes 23 to be coupled to each other.

A permanent magnet 24 may be provided in the rotor core 21. As one example, permanent magnets 24 may be provided in an outer circumferential surface of the rotor core 21 along the circumferential direction. N-poles and S-poles of the permanent magnets 24 may be alternatively magnetized along the circumferential direction. FIG. 1 shows that 4 permanent magnets are magnetized into N-poles and S-poles along the circumferential direction alternatively.

The motor having the permanent magnets provided in the rotor core 210 may include a brushless direct current (BLDC) motor. As the permanent magnets are provided in the rotor core 21, a performance of the motor may be improved, and a control of the motor may be performed precisely.

The motor having the stator type has several points of improvement.

For example, the yoke 11 is provided as the integral part, and the stator core including the teeth 12 and the yoke 11 is also provided as the integral part. In this case, the area of the slot may be small, which may limit the number of coil turns and a diameter of the wound coils. The wire loss generated in the coil is relatively large so that it may be difficult to increase efficiency.

In some cases, the winding work of the coil may be performed using a nozzle. In these cases, the fill factor may decrease, and the winding workability may be deteriorated.

In some cases, it may be difficult to change the external appearance and size of the stator core, which may limit reduction of the material used for fabricating the stator core. For example, the shape or size of the stator core may be changed little in the conventional motor. In this case, it may be difficult to reduce material used for the stator core.

SUMMARY

The present disclosure may provide a stator, which may increase the number of coil turns and diameters and improve motor efficiency by reducing the wire loss generated in the coil, and a motor including the stator.

The present disclosure may also provide a stator which may facilitate the winding work of the coil and improve the fill factor, and a motor including the stator.

The present disclosure may also provide a stator which may raise the output intensity by reducing the size while maintaining the same output, and a motor including the stator.

The present disclosure may also provide a stator which has a high freedom of a gap design (e.g., a gap configured to receive a rotor) by dividing of a stator core, and a motor including the stator.

The present disclosure may also provide a stator which may be connected with diverse types of a rotor, and a motor including the stator.

The present disclosure may also provide a stator which may minimize a magnetic flux passage by reducing an area of a yoke and reduce the manufacturing cost by reducing the material used in fabricating the stator core, and a motor including the stator.

According to one aspect of the subject matter described in this application, a motor including a stator includes a first stator core, and a second stator core that is independent from the first stator core and that is symmetric to the first stator core with respect to a vertical line that passes through a center of the stator. Each of the first and second stator cores includes a yoke, a center tooth that extends from a center of the yoke toward the center of the stator, and outer teeth that extend from a first end of the yoke and a second end of the yoke, respectively. The center tooth is located between the outer teeth, and a length of the outer teeth is greater than a length of the center tooth.

Implementations according to this aspect may include one or more of the following features. For example, the center tooth may include a center tooth pole shoe that extends from an end of the center tooth in a circumferential direction toward each outer tooth, and each outer tooth may include an outer tooth pole shoe that extends from an end of each outer tooth toward at least one of the center tooth or the vertical line that passes through the center of the stator. The outer tooth pole shoe may include a first extension that extends from an outer end of an outer tooth among the outer teeth toward the vertical line that passes through the center of the stator, and a second extension that extends from an inner end of the outer tooth toward the center tooth, in which a length of the first extension is greater than a length of the second extension.

In some examples, the motor may further include a rotor that is located in the stator and that has an outer surface that faces toward the center tooth pole shoe and the outer tooth pole shoe, and a circumferential length of the center tooth pole shoe may be equal to a circumferential length of the outer tooth pole shoe. The outer tooth pole shoe may define an angle that is less than 90 degrees between the first extension and the second extension, and the outer tooth may further include a first portion that extends from the yoke to the outer end of the outer tooth and that defines an angle less than 180 degrees with respect to the first extension, and a second portion that extends from the yoke to the inner end of the outer tooth and that defines an angle of 90 degrees with respect to the second extension.

In some examples, each of the first and second stator cores may further include a slot that is defined between the center tooth and the outer tooth, and a slot opening defined between the center tooth pole shoe and the outer tooth pole shoe, where a circumferential width of the slot opening is less than a width of the center tooth and a width of the outer tooth. The yoke may include an inner surface that defines at least a portion of the slot, and a radial line that extends from the center of the stator to a center of the slot opening passes outside of the inner surface of the yoke.

In some implementations, each of the first stator core and the second stator core may be symmetric with respect to a horizontal line that passes through the center of the stator. The yoke may extend in a longitudinal direction that is perpendicular to an extension direction of the center tooth and the outer teeth. The center tooth and the outer teeth may extend along a line, and the center tooth and an outer tooth among the outer teeth define a slot between the center tooth and the outer tooth. The slot may include a first portion defined by an inner surface of the outer tooth and an inner surface of the yoke, and a second portion defined by a surface of the center tooth and the inner surface of the yoke, where an area of the first portion is equal to an area of the second portion.

In some examples, the first portion defines a first ratio based on a height of the first portion over a length of the first portion, and the second portion defines a second ratio based on a height of the second portion over a length of the second portion, where the second ratio exceeds the first ratio. For example, the first ratio may be from 0.27 to 0.33. The second ratio may be from 0.55 to 0.67. In some examples, the motor may further include a 3-phase coil that is wounded around each of the center tooth and the outer teeth along a circumferential direction of the stator.

In some implementations, the first and second stator cores may define a horizontal width of the stator based on a distance from an outer end of the first stator core to an outer end of the second stator core, and a vertical width of the stator based on a side length of one of the first stator core and the second stator core, where the horizontal width of the stator is greater than the vertical width of the stator. For example, a ratio of the vertical width of the stator over the horizontal width of the stator may be from 0.55 to 0.65.

In some examples, a width of an outer tooth among the outer teeth may be greater than or equal to a width of the yoke. For example, a ratio of the width of the yoke over the width of the outer tooth is from 0.8 to 1. A width of the center tooth may be greater than or equal to a width of an outer tooth among the outer teeth. A ratio of the width of the outer tooth over the width of the center tooth is from 0.95 to 1.

In some examples, the first stator core and the second stator core may be divided and independently formed by corresponding divided yokes.

In some cases, the yoke, the center teeth, or the outer teeth may be integrally formed with each other. For example, the first stator core and the second stator core may be formed as one body.

In some cases, the yoke, the center teeth, and the outer teeth may be fabricated independently. For example, after the center teeth and the outer teeth are inserted in the bobbins the coils are wounded around, the center teeth and the outer teeth may be coupled to the yoke.

The coupling of the center and outer teeth to the yoke may be performed by coupling of a projection to a groove. The projections and grooves may be located in an outer surface of the bobbin and an inner surface of the yoke.

In some examples, the slot opening may be formed between the outer tooth pole shoes and a line extending from the center of the slot opening to the center of the stator core may not be overlapped with the yoke. In some cases, no yoke may be provided on the line.

In some examples, the center teeth and the outer teeth may extend in parallel.

Further scope of applicability of the present disclosure will become apparent from the detailed description given hereinafter. It should be understood that the detailed description and specific examples, while indicating example implementations of the disclosure, are given by illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings, which are given by illustration only, and thus are not limitative of the present disclosure.

DETAILED DESCRIPTION

Hereinafter, an example motor in accordance with the present disclosure will be described in detail, referring to the accompanying drawings.

Figure 2:
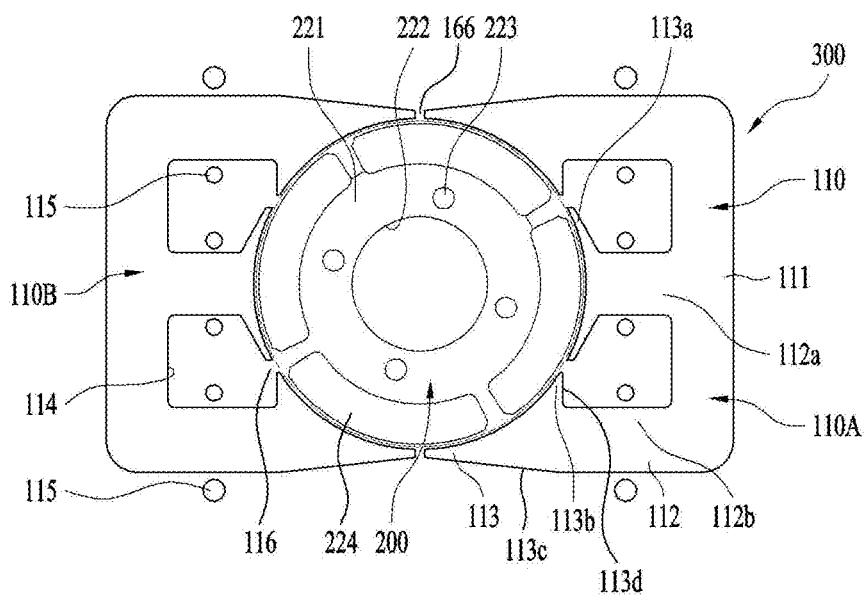
FIG. 2 is a plane view schematically showing an example motor.

FIG. 2 illustrates an example motor.

The motor 300 may include a stator 100 and a rotor 200. The rotor 200 may include a rotor core 221 formed as a magnetic body. The stator core 110 and the rotor core 221 may form a magnetic flux passage. Electric steel plates are disposed to form the stator core 110 and the rotor core 221 so that the core wire loss may be reduced. A shaft hole 222 and a coupling hole 223 may be formed in the rotor core 221. A plurality of magnets 224 may be also provided in the rotor core 221. In some examples, the rotor shown in FIG. 2 may be equal to the rotor shown in FIG. 1. However, the rotor of the motor in accordance with implementations of the present disclosure is not limited thereto, and diverse types of rotors may be applied to the motor.

The stator 100 may include a coil 115 configured to be wounded around the stator core 110.

The stator 100 includes a first stator core 110A and a second stator core 110B which are dividedly distinguished from each other. As mentioned above, the stator core is the magnetic flux passage. Accordingly, the first stator core 110A and the second stator core 110B are separated from each other so that a continuous magnetic flux may not be formed between them.

In some implementations, the divided stator cores 110A and 110B and the rotor 200 may form one motor, and a predetermined structure for connecting them with each other as one motor may be necessary. As one example, a motor mount or a motor housing may be provided. The stator 100 may be mounted in the motor mount or the motor housing and the rotor 200 may be inserted in the stator 100, only to form one single motor.

Figure 1:
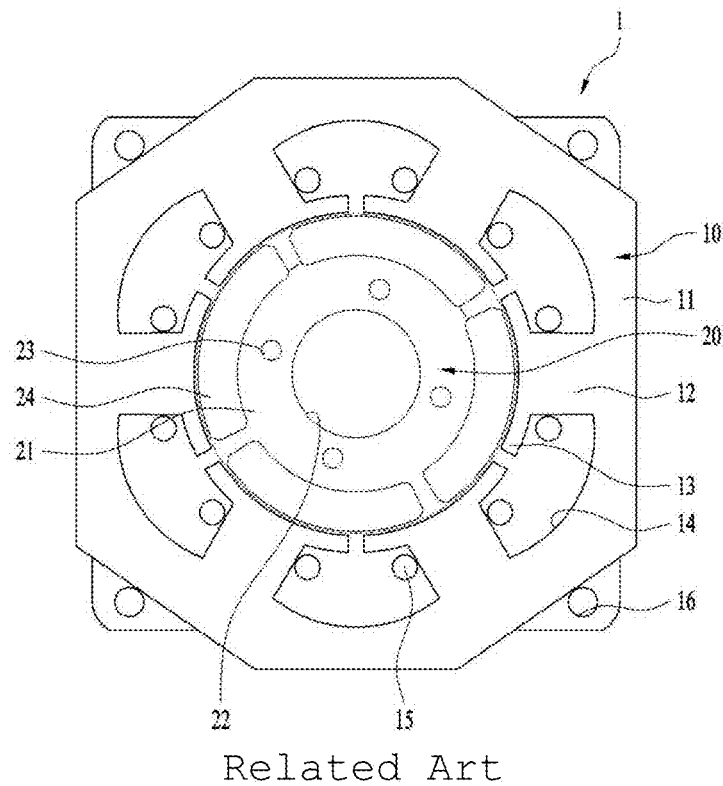
FIG. 1 is a plane view schematically showing a conventional motor of related art.

As shown in FIG. 1, a stator of a conventional motor may include a ring-shaped yoke. The yoke is provided to cover the rotor 360 degrees fully. By contrast, the yoke of the stator core according to the disclosure is partially formed along a circumferential direction. As one example, the yoke is formed in a left side of the stator core via the first stator core 110A and in a right side via the second stator core 110B. In this example, no yoke may be provided in an upper side and a lower side with respect to the rotor.

In this instance, upper, lower, left and right sides are determined based on a plane of the motor 300 shown in FIG. 2 for convenience.

The first stator core 110A and the second stator core 110B may be formed in symmetry. The two stator cores are equal in the size and shape so that it is preferred that they are made of one same element. As shown in FIG. 2, the first stator core 110A and the second stator core 110B are named after the location and they are formed identically.

Hereinafter, the first stator core 110A will be described in detail. The description may be applied to the second stator core 110B.

The first stator core 110A may include the yoke 111, the plurality of teeth 112, and a pole shoe 113 provided at end of each of the teeth.

The plurality of teeth 112 are projected from the yoke 111 inwardly to an inside of the first stator core 110A. The plurality of teeth 112 may include center teeth 112a and outer teeth 112b. The outer teeth 112b may be provided in upper and lower areas of the center teeth, respectively.

The center teeth 112a may extend from a longitudinal center of the yoke toward a center of the stator or the stator core. The center of the stator or the stator core may be equal to the center of the motor or the center of the rotor.

The outer teeth 112b may extend from an upper end and a lower end of the yoke 111 longer than the center teeth. In other words, the outer teeth 112b may be longer than the center teeth 112a.

Each of the center teeth 112a and outer teeth 112b may have a linearly extended area. For example, the center teeth 112a and the outer teeth 112b may linearly extend except both ends of each center and outer teeth. The coil is wounded around the linearly extended area. In some examples, the 3-phase coil may be wounded around each of the teeth sequentially.

A center teeth pole shoe 113a is formed in an end of the center tooth. The pole shoe 113a may extend from the end of the center tooth 112a in both opposite directions along the circumferential direction. Two surfaces of the pole shoe 113a which faces the rotor 200 may define a gap of the motor.

The yoke 111 may be located in a predetermined area of the rotor 200 and it extends from a longitudinal center upwards and downwards. The yoke 111 may extend in a linear or curved shape. In case the yoke 111 extends in the curved shape, a curvature radius of the yoke 111 may be larger than a curvature radius of the rotor. Accordingly, a distance from the longitudinal center of the yoke 111 to the center of the rotor may be farther than a distance from the upper and lower ends of the yoke 111 to the center of the rotor.

A surface which faces the rotor 200 may be formed not only in the center tooth 112a but also in the outer tooth 112b. In some examples, the outer tooth 112b includes an outer tooth pole shoe that extends from an end of the outer tooth 112b and that faces the rotor 200. In some cases, to define the outer tooth pole shoe 113b, the extended area of the center tooth 112a may be longer than the extended area of the outer tooth 112b.

In some examples, both sides of the pole shoe 113a formed in the center tooth 112a may be identically formed or substantially equal to each other. By contrast, both sides of the outer tooth pole shoe 113b may be different from each other, because a distance between an inner end of the outer tooth 112b and the center of the rotor is different from a distance between an outer end of the outer tooth 112b and the center of the rotor. In other words, the former distance is greater than the latter distance.

For example, the outer tooth pole shoe 113b may include a long distance area 113c that extends a long distance from an outer end of the outer tooth 112b, and a short distance area 113d that extends a short distance from an inner end of the outer tooth 112b.

The area of the center tooth 112a corresponding to the long distance area is substantially equal to the area corresponding to the short distance area. Both sides of the center tooth pole shoe 113a may be in symmetry with respect to the center of the tooth. In contrast, both sides of the outer tooth pole shoe 113b may be in asymmetry with respect to the center of the tooth because of the difference between long distance area and the short distance area.

A slot 114 is formed between the center tooth 112a and the outer tooth 112b. The slot may be the space where the coil 115 is wounded. A slot 114 is also formed in an outer portion of the outer tooth 112b. The slot formed in the outer portion of the outer tooth 112b is different from the slot formed in an inner portion of the outer tooth 112b. For example, the latter slot is the substantially closed space and the former slot is the substantially open space.

In some examples, a first slot opening 116 may be defined between the center tooth pole shoe 113a and the outer tooth pole shoe 113b. In some examples, a second slot opening 166 may be defined between one outer tooth pole shoe 113b and another neighboring outer tooth pole shoe 113b.

FIG. 2 shows total 6 teeth. The 3-phase coil is wounded around each of the teeth. As one example, a w-phase coil is wounded around a right upper outer tooth and a v-phase coil is wounded around a left center tooth and a u-phase coil may be wounded around a left upper outer tooth.

To have 3-phase magneto-motive force equilibrium, each coil may have the same number of the coil turns (the number of windings) and the same pole shoe length. Also, each coil may have the same fill factor of each slot.

Figure 3:
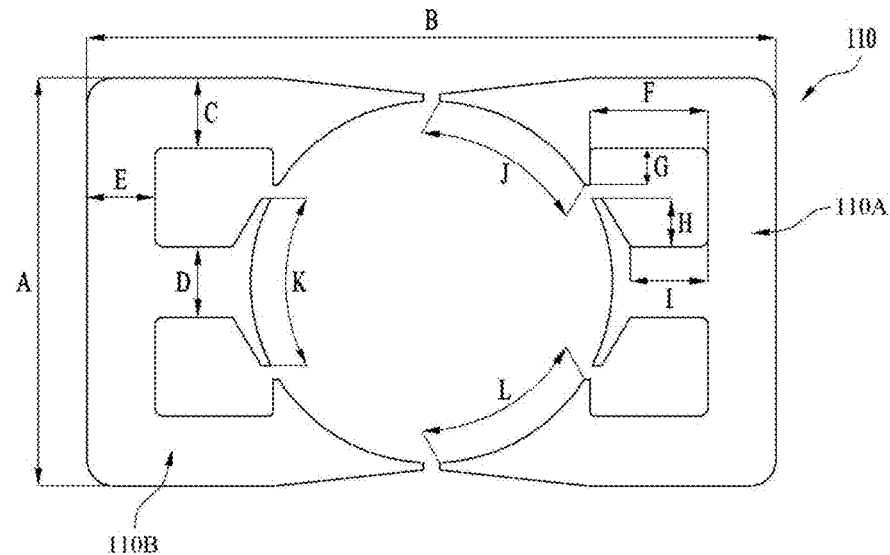
FIG. 3 is a plane view of an example stator core shown in FIG. 2.

Referring to FIG. 3, the following design variables may be put into consideration to satisfy 3-phase magneto-motive force equilibrium.

The tooth-length has to be put into consideration. The tooth-length includes the length of the center tooth 112a and the length of the outer tooth 112b. For example, the tooth-length may be a length that is measured from the yoke 111, except for the area corresponding to the pole shoe. For example, as shown in FIG. 3, the outer tooth 112b has a length referred as F from the yoke 111, and the center tooth 112a has a length referred as I from the yoke 111. In this example, the long distance area 113c and the short distance area 113d are formed in the outer tooth 112b, where a difference between the inner length and the outer length of the outer tooth 112b corresponds to a difference between the lengths of the long distance area 113c and the short distance area 113d. In terms of a length from the yoke to the pole shoe, the center tooth 112a includes one teeth-length to consider, and the outer tooth 112b includes two teeth-lengths to consider. Accordingly, there may be three variables in the tooth-length in this example.

The tooth-length is an important variable in determining the size of the motor. As the tooth-length increases, the right-and-left length of the motor increases. As the tooth-length varies, an inner diameter of the stator, the slot area, and the pole shoe length may be varied. Accordingly, the tooth-length has a close relation with the motor efficiency as the magnetic flux passage.

The yoke-length has to be put into consideration. The yoke-length is the vertical length of the yoke. In FIG. 3, the yoke-length is referred to as A. The yoke-length is also another important variable in determining the size of the motor. As the tooth-length becomes increasing more and more, the vertical length of the motor becomes increasing more and more. The yoke-length may determine the slot area by the interaction with the width of the tooth. The yoke-length is a length of the magnetic flux passage that has a close relation with the motor efficiency.

The pole shoe length has to be put into consideration. The pole shoe may determine the pitch of the polarity as the magnetic flux passage generated between the stator and the rotor. Referring to FIG. 3, the pole shoe length is referred to as J, K, and L. A waveform of a counter electro-motive force may be in asymmetry when the lengths of the both sides are imbalanced. In this example, the pole shoe lengths of the teeth are equal to each other to have the 3-phase electro-motive force equilibrium. In some examples, J, K, and L may be equal to each other.

The tooth-width has to be put into consideration. The tooth-length is a size of the space as the magnetic flux passage. Accordingly, the tooth-length has to be designed, considering the saturated magnetic flux density. In FIG. 3, the tooth-width is referred to as C and D. The tooth-width may be related to the core loss. For example, as the tooth-width increases, the core loss decreases, and the slot area increases. Accordingly, the tooth-width may be determined based on the saturated flux intensity and the slot area.

The yoke-width has to be put into consideration. The yoke is the passage of the magnetic flux from the teeth, and the yoke-width is a size of the space for the magnetic flux passage. Accordingly, the yoke-width has to be determined, considering the tooth-width. In FIG. 3, the yoke-width is referred to as E.

The right-and-left width of the stator core is referred to as B in FIG. 3. For example, the length B is measured from an outer end of the first stator core 110A to an outer end of the second stator core 110B. Accordingly, the size of the motor may be determined based on a value which is gained by multiplying the vertical width of the stator core by the right-and-left width of the stator core. In other words, an amount of the material for the motor may be determined by the size of the stator core.

For instance, the right-and-left width and the vertical width of the stator core shown in FIG. 1 may be 106 mm and 111 mm, respectively. The right-and-left width and the vertical width of the stator core may be 116 mm and 69 mm, for instance. The area of the stator core may be 68% of the area of the conventional stator core. For example, the amount of the electric plates used in fabricating the stator core can be reduced. Accordingly, the motor manufacturing cost may be reduced.

Hereinafter, the relations among the variables for the 3-phase electro-motive force equilibrium by the winding of the 3-phase coil around the stator core will be described in detail.

The ratio of B as the right-and-left width of the stator core to A as the vertical width of the stator core may be approximately 0.55~0.66 (e.g., A/B=0.55~0.66). An increase of the ratio A/B may have the stator core 110 to become closer to the one shown in FIG. 1, for instance. By lowering the ratio A/B, the slot area may be reduced, and it may become difficult to satisfy the 3-phase electro-motive force equilibrium under and over the stator core.

The ratio of C as the width of the outer tooth 112b to E as the yoke width may be approximately 0.8~1 (e.g., E/C=0.8~1). For example, the width of the outer tooth 112b is equal to or larger than the yoke width. The ratio of D as the center tooth width to C as the outer tooth width may be approximately 0.95~1 (e.g., C/D=0.95~1). For example, the width of the center tooth 112a may be equal to or a little larger than the width of the outer tooth 112b.

In this instance, the width of the outer tooth 112b is equal to the width of the center tooth to make the magnetic flux flowing to each of the teeth equal to each other. However, the width of the center tooth is somewhat larger than the width of the center teeth to prevent the magnetic flux saturation in the center tooth. Accordingly, the ratio of the outer tooth to the width of the center tooth may be approximately 0.95~1.

In some examples, the outer tooth may be relatively longer than the center tooth in a linear length. As the outer tooth becomes longer and longer, the wire loss may become increasing more and more. Accordingly, the width of the outer tooth may be larger than the width of the yoke to compensate the wire loss. If the yoke width is larger than the outer tooth width, the yoke width is unnecessarily increasing. For example, the amount of the material may increase unnecessarily. While, if the yoke width is much smaller than the width of the outer tooth, magnetic flux saturation might be generated in the yoke. Accordingly, the ratio of the outer tooth width to the yoke width may be approximately 0.8~1.

The slot area of the coil winding around each of the teeth may be equal as mentioned above. The areas of the slots formed in both sides with respect to the center tooth 112a are equal to each other, because the center tooth is in symmetry. Accordingly, the area of the slot formed with respect to the center tooth 112a may be equal to the area of the slot formed in the outer tooth 112b (e.g., inside the outer tooth 112b).

As mentioned above, the linear length of the outer tooth is larger than that of the center tooth. The linear length may determine the area of the slot. If such the linear distance is the right-and-left width of the slot, the vertical length determine by the pole shoe may be the height of the slot. Accordingly, the height of the slot formed in the center tooth may be larger than that of the slot formed in the outer tooth.

For instance, the slot formed in an outer portion of the outer tooth 112b is an open space, so the area of the slot in the open space may not be considered here. On the other hand, the slot formed in the outer tooth 112b is in a substantially closed space, so the height of the slot may be determined by the height of the short distance area 113d.

The shape difference between the outer tooth and the center tooth may result in a versatility of the slot. In this instance, the slot areas may be equal to each other.

For example, the ratio of F as the length of the slot formed in the outer tooth to G as the height of the slot in the outer tooth (e.g., G/F) may be approximately 0.27~0.33. The ratio of I as the length of the slot formed in the center tooth to H as the height of the slot formed in the center tooth (e.g. H/I) may be approximately 0.55~0.67. In other words, the latter ratio may be greater than the former ratio. In examples where the slot areas are equal to each other, the slot lengths may be different from each other, and thus the slot heights are different from each other.

A decrease of the ratio G/F and the ratio H/I may make the stator core 110 longer horizontally or in a right and left direction. For example, the lengths of the teeth may increase to decrease the ratio G/F or the ratio H/I. In this case, it may be difficult to form the 3-phase electro-motive force equilibrium. On the other hand, an increase of the ratio G/F and the ratio H/I may have the stator core 110 to become closer to the structure shown in FIG. 1. In this case, the intended effects and objects may be difficult to achieve.

As described above, the implementation disclosing that the coil is directly wounded around the teeth is described. Hereinafter, another implementation disclosing that the coil is wounded by using a bobbin will be described.

A bobbin 130 for winding the coil may be independently provided from the teeth. After the coil is wounded around the bobbin 130, each of the teeth may be inserted in the bobbin. For example, the teeth and the yoke are fabricated as independent parts and coupled to each other.

The bobbin may be applied to the conventional stator shown in FIG. 1. In other words, after each of the teeth is inserted in the bobbin, the bobbin may be coupled to the ring-shaped yoke. However, in this instance, six teeth have to be secured to the relatively large sized ring-shaped yoke so that workability may not be so excellent. When the yoke is secured to the teeth by using a device, the device has to be complicated and large-sized and the number of the teeth is large so that the device may become complicated and enlarged.

In some examples, the yoke is relatively small and formed in a simple shape. The number of the teeth secured to one yoke may be reduced to a half so that the coupling device may be simple and small. Accordingly, the coupling process between the yoke and the teeth may be performed quite efficiently and smoothly. That is because the stator core is divided into the right and left stator cores and the first stator core and the second stator core are identically formed.

When the coil is wounded by using the bobbin 130, the entire slot area may be used, in which the fill factor can be improved a lot. Accordingly, the highly efficient motor can be provided.

Figure 4:
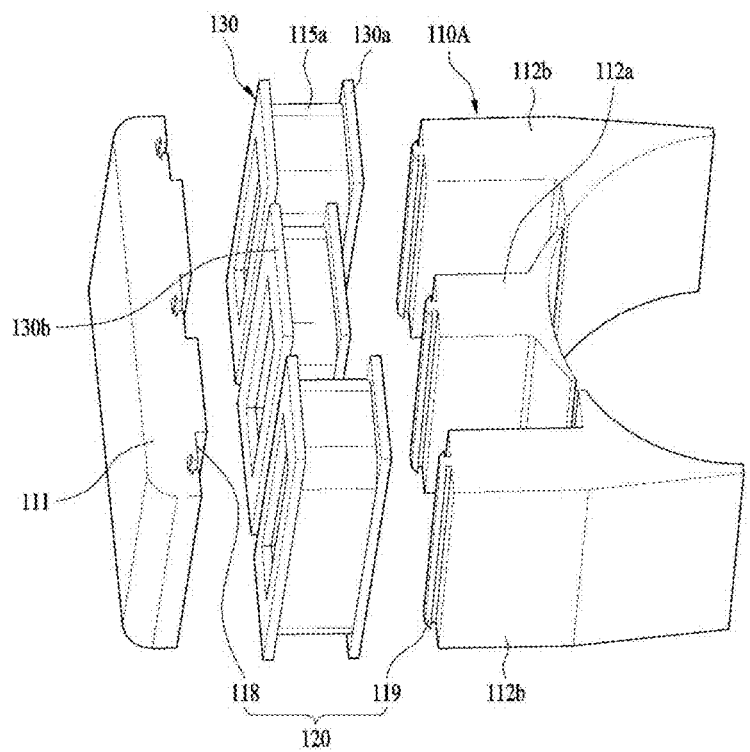
FIG. 4 is a perspective view showing an example pair of teeth and an example yoke of an example first stator core that are separated from an example bobbin.
Figure 5:
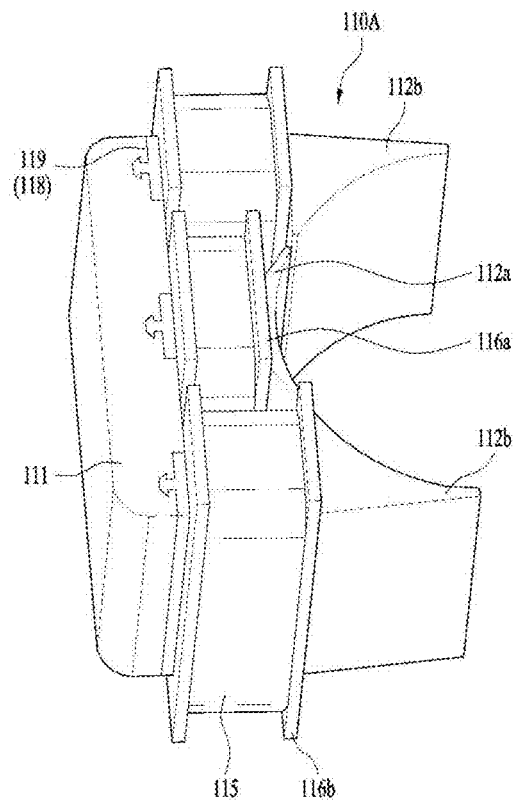
FIG. 5 is a perspective view showing the first stator core and the bobbin that are coupled to each other.

As shown in FIGS. 4 and 5, the yoke 111, the bobbin 130 and the teeth 112 are formed as independent parts and then coupled to each other. Each of the coils may be wounded around the bobbin 130.

Each of the teeth may be inserted in the bobbin 130 having the coils wounded there around. In other words, the linear length area of the tooth may penetrate the bobbin. The length of the tooth may extend more, penetrating the bobbin. A securing area 119 may be formed in one end of each tooth.

Corresponding to the coupling areas 119 of each tooth, a coupling area 118 may be formed in the yoke 111. The two coupling areas may be formed in corresponding shapes. One of them may be a groove type and the other may be a projection. After the two coupling areas are coupled to each other, a welding process is performed and the coupling may be more stable.

In this instance, the two coupling areas may be an outer area of the bobbin 130 to couple the teeth to the yoke smoothly after the bobbin 130 is coupled to each of the teeth. Such the coupling areas are substantially corresponding to the yoke 111. In other words, one side of the bobbin may closely contact with the yoke and the other side with the pole shoe, so that the width of the bobbin can be equal to the length of the tooth substantially. As the length of the outer tooth is different from that of the center tooth, the bobbin 130a in which the outer tooth is inserted may be different from another bobbin 130b in which the center tooth is inserted.

Hereinafter, the effects of the motor of the present disclosure will be described in detail, referring to FIGS. 6 and 7.

Figure 6:
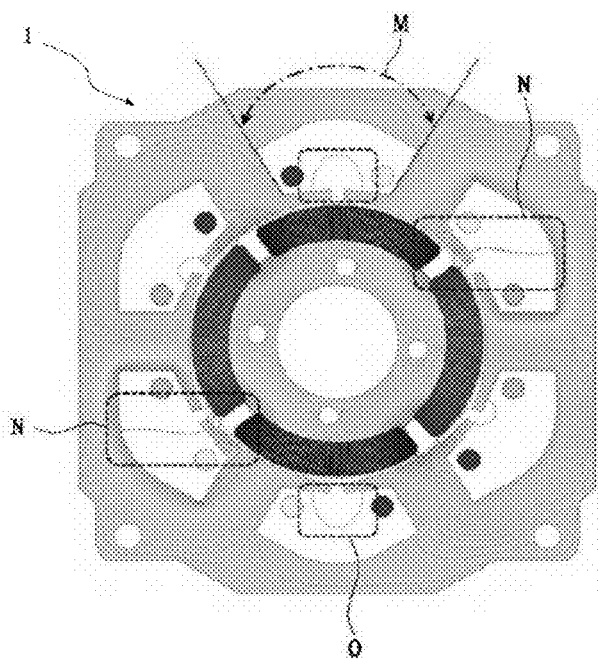
FIG. 6 is a view showing an example magnetic flux of the motor shown in FIG. 1.
Figure 7:
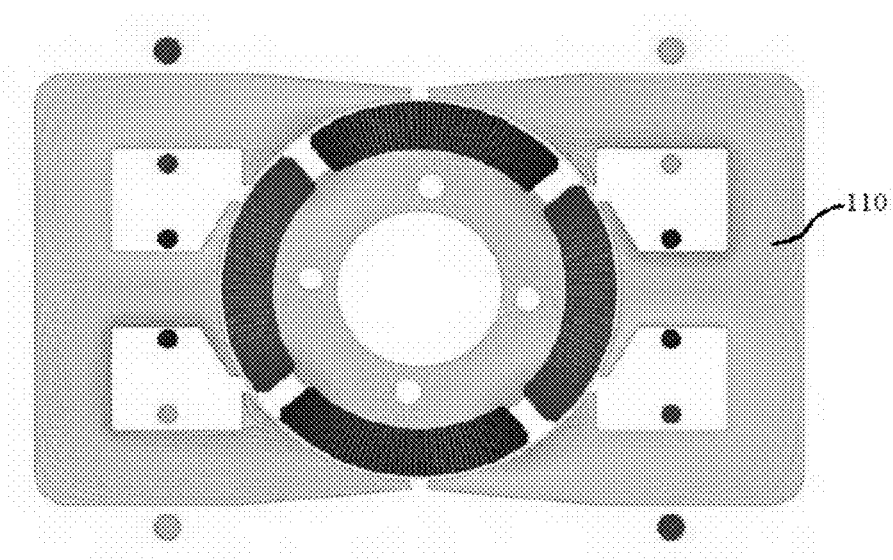
FIG. 7 is a view showing an example magnetic flux of the motor shown in FIG. 2.

FIG. 6 is a diagram of a magnetic flux of the motor shown in FIG. 1 and FIG. 7 is a diagram of a magnetic flux of the motor shown in FIG. 2.

It is shown that little magnetic flux is generated in the conventional stator core in M-section. It is known that such M-section may be symmetrically generated in the stator core. Accordingly, the stator core corresponding to this period may be irrelevant to the performance of the motor.

Leakage flux may be generated in the slot opening arranged in the M-period, which is indicated as O in the drawing. A magnetic flux passage is formed between neighboring pole shoes and such a magnetic flux passage could be a leakage flux as the cause of the motor performance deterioration.

Leakage flux may be also generated in the N-area. The leakage flux might be generated between one pole shoe adjacent to the slot opening and a neighboring yoke, in which the magnetic flux generated in the yoke may fail to flow via the teeth but directly flow to the pole shoe, which may cause deterioration of the motor performance. Thus, the leakage flux may be generated because the distance between the pole shoe and the yoke is relatively short.

In some examples, the magnetic flux may be generated in almost entire area of the stator core without unnecessary parts. As the unnecessary parts are omitted, the leakage flux generated in the slot opening may be minimized.

In some implementations, the stator core 110 may include a portion that is arranged between the outer teeth and that omits the yoke. For instance, a portion corresponding to the slot opening 166 omits the yoke. In this case, the unnecessary yoke portion may be omitted to generate no magnetic flux leakage between the yoke and the slot opening.

In some examples, the magnetic leakage generated between the yoke and the slot opening between the outer tooth and the center tooth may be minimized. For example, the slot may be in right and left asymmetry with respect to a line from the center of the slot opening and the center of the rotor. The line and the inside of the yoke are not overlapped with each other. In other words, the distance between the slot opening and the yoke inside may be relatively increased so that the magnetic flux directly flowing to the slot opening from the yoke may be remarkably reduced.

Accordingly, this implementation may reduce the leakage flux by minimizing the magnetic flux passage and improve the output intensity.

The motor may use diverse types of rotors. For example, various types of rotors, including but not limited to Surface Permanent Magnet (SMP) rotor shown in FIG. 1, may be used in the motor.

Figure 8:
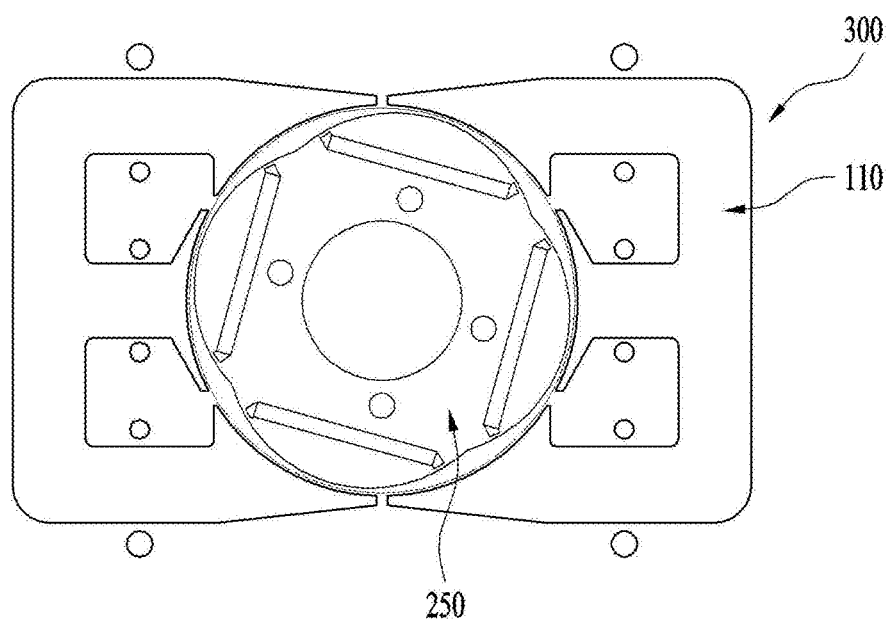
FIG. 8 is a plane view showing an example rotor.
Figure 9:
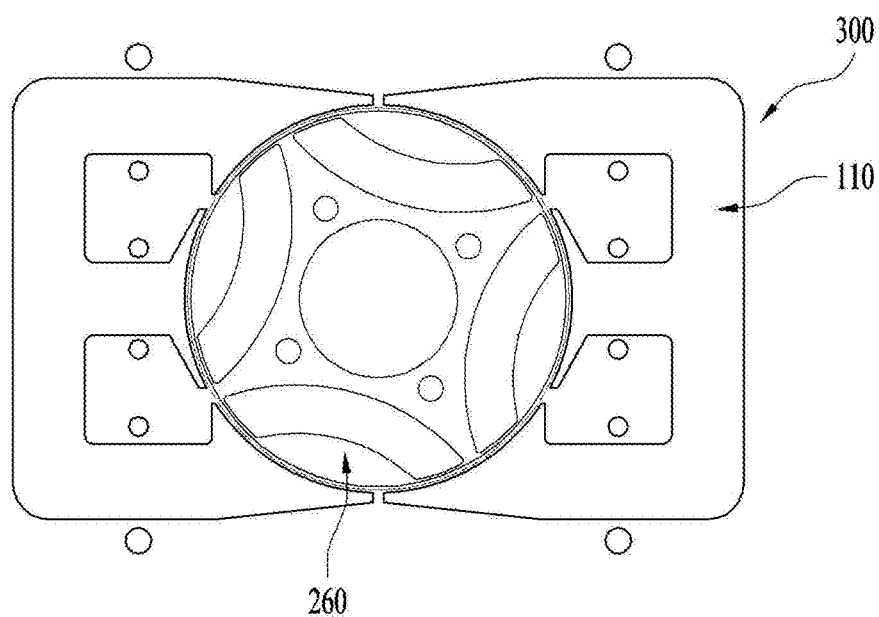
FIG. 9 is a plane view showing another example rotor.

FIGS. 8 and 9 illustrate an Interior Permanent Magnet (IPM) rotor. Permanent magnets are not arranged on an outer surface of the rotor and in an inner surface of the rotor. The IPM rotor uses Neodymium (Nd) magnets or ferrite magnets as the permanent magnets. The two types of the rotors are different from each other in the shape and size. Typically, the SPM rotor uses the ferrite magnets.

While, the SPM rotor uses only a magnetic torque which is generated by the permanent magnets, the IPM rotor uses not only the magnetic torque but also a reluctance torque which is generated by a difference of magnetic resistances. Accordingly, the manufacturing cost of the IPM rotor is increased and the range of operation areas may be wider.

As described above, the rotor applied to the motor may be diverse. The motor in this disclosure is substantially characterized by the stator core, for instance.

As the present features may be embodied in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A motor including a stator, comprising:
a first stator core; and
a second stator core that is independent from the first stator core and that is symmetric to the first stator core with respect to a vertical line that passes through a center of the stator,
wherein each of the first and second stator cores comprises:
a yoke,
a center tooth that extends from a center of the yoke toward the center of the stator, and
outer teeth that extend from a first end of the yoke and a second end of the yoke, respectively,
wherein the center tooth is located between the outer teeth,
wherein a length of the outer teeth is greater than a length of the center tooth,
wherein the center tooth and the outer teeth extend along a line,
wherein the center tooth and an outer tooth among the outer teeth define a slot between the center tooth and the outer tooth,
wherein the slot includes:
a first portion defined by an inner surface of the outer tooth and an inner surface of the yoke, and
a second portion defined by a surface of the center tooth and the inner surface of the yoke, and
wherein an area of the first portion is equal to an area of the second portion.

2. The motor of claim 1, wherein the center tooth includes a center tooth pole shoe that extends from an end of the center tooth in a circumferential direction toward each outer tooth,
wherein each outer tooth comprises an outer tooth pole shoe that extends from an end of each outer tooth toward at least one of the center tooth or the vertical line that passes through the center of the stator,
wherein the outer tooth pole shoe includes:
a first extension that extends from an outer end of an outer tooth among the outer teeth toward the vertical line that passes through the center of the stator, and
a second extension that extends from an inner end of the outer tooth toward the center tooth, and
wherein a length of the first extension is greater than a length of the second extension.

3. The motor of claim 2, further comprising a rotor that is located in the stator and that has an outer surface that faces toward the center tooth pole shoe and the outer tooth pole shoe,
wherein a circumferential length of the center tooth pole shoe is equal to a circumferential length of the outer tooth pole shoe.

4. The motor of claim 2, wherein each of the first and second stator cores defines:
a slot opening between the center tooth pole shoe and the outer tooth pole shoe, and
wherein a circumferential width of the slot opening is less than a width of the center tooth and a width of the outer tooth.

5. The motor of claim 1, wherein each of the first stator core and the second stator core is symmetric with respect to a horizontal line that passes through the center of the stator.

6. The motor of claim 1, wherein the yoke extends in a longitudinal direction that is perpendicular to an extension direction of the center tooth and the outer teeth.

7. The motor of claim 1, wherein the first portion defines a first ratio based on a height of the first portion over a length of the first portion, and
wherein the second portion defines a second ratio based on a height of the second portion over a length of the second portion, the second ratio exceeding the first ratio.

8. The motor of claim 7, wherein the first ratio is from 0.27 to 0.33.

9. The motor of claim 8, wherein the second ratio is from 0.55 to 0.67.

10. The motor of claim 9, further comprising a 3-phase coil that is wounded around each of the center tooth and the outer teeth along a circumferential direction of the stator.

11. The motor of claim 1, wherein the first and second stator cores define:
- a horizontal width of the stator based on a distance from an outer end of the first stator core to an outer end of the second stator core; and
- a vertical width of the stator based on a side length of one of the first stator core and the second stator core,
- wherein the horizontal width of the stator is greater than the vertical width of the stator.

12. The motor of claim 11, wherein a ratio of the vertical width of the stator over the horizontal width of the stator is from 0.55 to 0.65.

13. The motor of claim 1, wherein a width of an outer tooth among the outer teeth is greater than or equal to a width of the yoke.

14. The motor of claim 13, wherein a ratio of the width of the yoke over the width of the outer tooth is from 0.8 to 1.

15. The motor of claim 1, wherein a width of the center tooth is greater than or equal to a width of an outer tooth among the outer teeth.

16. The motor of claim 15, wherein a ratio of the width of the outer tooth over the width of the center tooth is from 0.95 to 1.

* * * * *